(12) United States Patent
Ortega

(10) Patent No.: US 9,505,461 B1
(45) Date of Patent: Nov. 29, 2016

(54) BICYCLE WITH ADJUSTABLE PEDALING RESISTANCE USING MAGNETORHEOLOGICAL BASED FLUID

(71) Applicant: Rene M. Ortega, Oceanside, CA (US)

(72) Inventor: Rene M. Ortega, Oceanside, CA (US)

(*) Notice: Subject to any disclaimer, the term of this patent is extended or adjusted under 35 U.S.C. 154(b) by 0 days.

(21) Appl. No.: 15/090,764

(22) Filed: Apr. 5, 2016

(51) Int. Cl.
B62M 1/36 (2013.01)
B62M 3/16 (2006.01)
B62M 9/02 (2006.01)
F16D 57/00 (2006.01)
F16F 9/53 (2006.01)

(52) U.S. Cl.
CPC ............. B62M 3/16 (2013.01); B62M 1/36 (2013.01); B62M 9/02 (2013.01); F16D 57/002 (2013.01); F16F 9/535 (2013.01)

(58) Field of Classification Search
CPC .......... B62M 3/16; B62M 1/36; B62M 9/02; F16D 57/002; F16F 9/535
USPC ........................ 280/259, 260, 261
See application file for complete search history.

(56) References Cited

U.S. PATENT DOCUMENTS

| | | | |
|---|---|---|---|
| 2,673,631 A * | 3/1954 | Gold | F16D 37/02 192/21.5 |
| 5,195,936 A * | 3/1993 | Mao | A63B 21/008 482/112 |
| 5,816,372 A | 10/1998 | Carlson | |
| 6,117,093 A * | 9/2000 | Carlson | A63B 21/0056 482/4 |
| 6,367,352 B1 * | 4/2002 | Niculescu | B62M 1/36 474/69 |
| 6,786,497 B1 * | 9/2004 | Olszewski | B62M 11/12 280/260 |
| 7,059,618 B2 | 6/2006 | Mallard | |
| 8,602,929 B2 | 12/2013 | Ishikawa | |
| 8,955,395 B2 | 2/2015 | Bjork | |
| 9,091,309 B2 | 7/2015 | Battlogg | |
| 2007/0210552 A1 * | 9/2007 | Nicolai | B62M 11/06 280/259 |
| 2015/0247548 A1 | 9/2015 | Battlogg | |

FOREIGN PATENT DOCUMENTS

WO 9607836 A2 3/1996

* cited by examiner

Primary Examiner — Tony Winner

(57) ABSTRACT

The bicycle with adjustable pedaling resistance using magnetorheological-based fluid is a bicycle that includes a pedaling resistance member. The pedaling resistance member is optionally used to increase the resistance of the bicycle pedals when in use. The pedaling resistance member is integrated into the frame of the bicycle, and includes a hollow cylinder that is partially filled with a magnetorheological fluid. A paddle is affixed to a crankshaft that extends between the bicycle pedals, and across the hollow cylinder. A powering member is in wired connection with an electromagnetic coil, which is in fluid connection with the magnetorheological fluid. The powering member is able to apply electricity to the magnetorheological fluid, which in turn increases viscosity of the magnetorheological fluid thereby increasing pedaling resistance to the bicycle pedals via the paddle rotating within the hollow cylinder.

7 Claims, 5 Drawing Sheets

BICYCLE WITH ADJUSTABLE PEDALING RESISTANCE USING MAGNETORHEOLOGICAL BASED FLUID

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bicycles, more specifically, a bicycle where the user can adjust the pedaling resistance that includes a magnetorheological fluid.

SUMMARY OF INVENTION

The bicycle with adjustable pedaling resistance using magnetorheological-based fluid is a bicycle that includes a pedaling resistance member. The pedaling resistance member is optionally used to increase the resistance of the bicycle pedals when in use. The pedaling resistance member is integrated into the frame of the bicycle, and includes a hollow cylinder that is partially filled with a magnetorheological fluid. A paddle is affixed to a crankshaft that extends between the bicycle pedals, connection with an electromagnetic coil, which is in fluid connection with the magnetorheological fluid. The powering member is able to apply electricity to the magnetorheological fluid, which in turn increases viscosity of the magnetorheological fluid thereby increasing pedaling resistance to the bicycle pedals via the paddle rotating within the hollow cylinder. Optionally, a voltmeter is in wired connection between the powering member and the electromagnetic coil so as to enable adjustment of the electricity supplied to the magnetorheological fluid.

It is an object of the invention to provide a bicycle that works in a manner consistent with a standard bicycle, but that incorporates a pedaling resistance member, which when activated shall increase a resistance to rotate the bicycle pedals.

These together with additional objects, features and advantages of the bicycle with adjustable pedaling resistance using magnetorheological based fluid will be readily apparent to those of ordinary skill in the art upon reading the following detailed description of the presently preferred, but nonetheless illustrative, embodiments when taken in conjunction with the accompanying drawings.

In this respect, before explaining the current embodiments of the bicycle with adjustable pedaling resistance using that the bicycle with adjustable pedaling resistance using magnetorheological based fluid is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bicycle with adjustable pedaling resistance using magnetorheological based fluid.

It is therefore important that the claims be regarded as including such equivalent construction insofar as they do not depart from the spirit and scope of the bicycle with adjustable pedaling resistance using magnetorheological based fluid. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are skilled in the art to practice the disclosure and are not intended to limit the scope of the appended claims.

DETAILED DESCRIPTION OF THE EMBODIMENT

Figure 1:
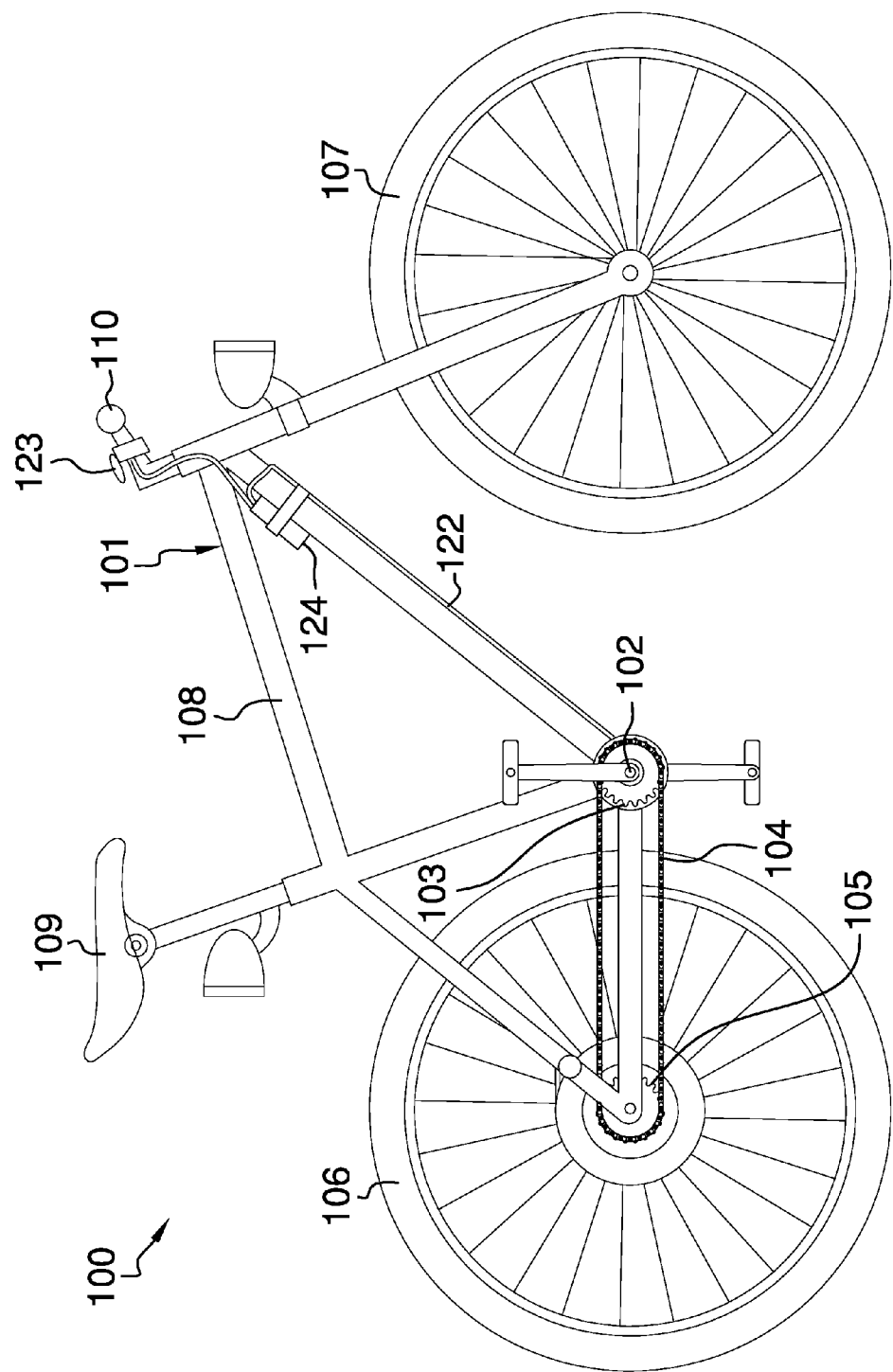
FIG. 1 is a side view of an embodiment of the disclosure.
Figure 2:
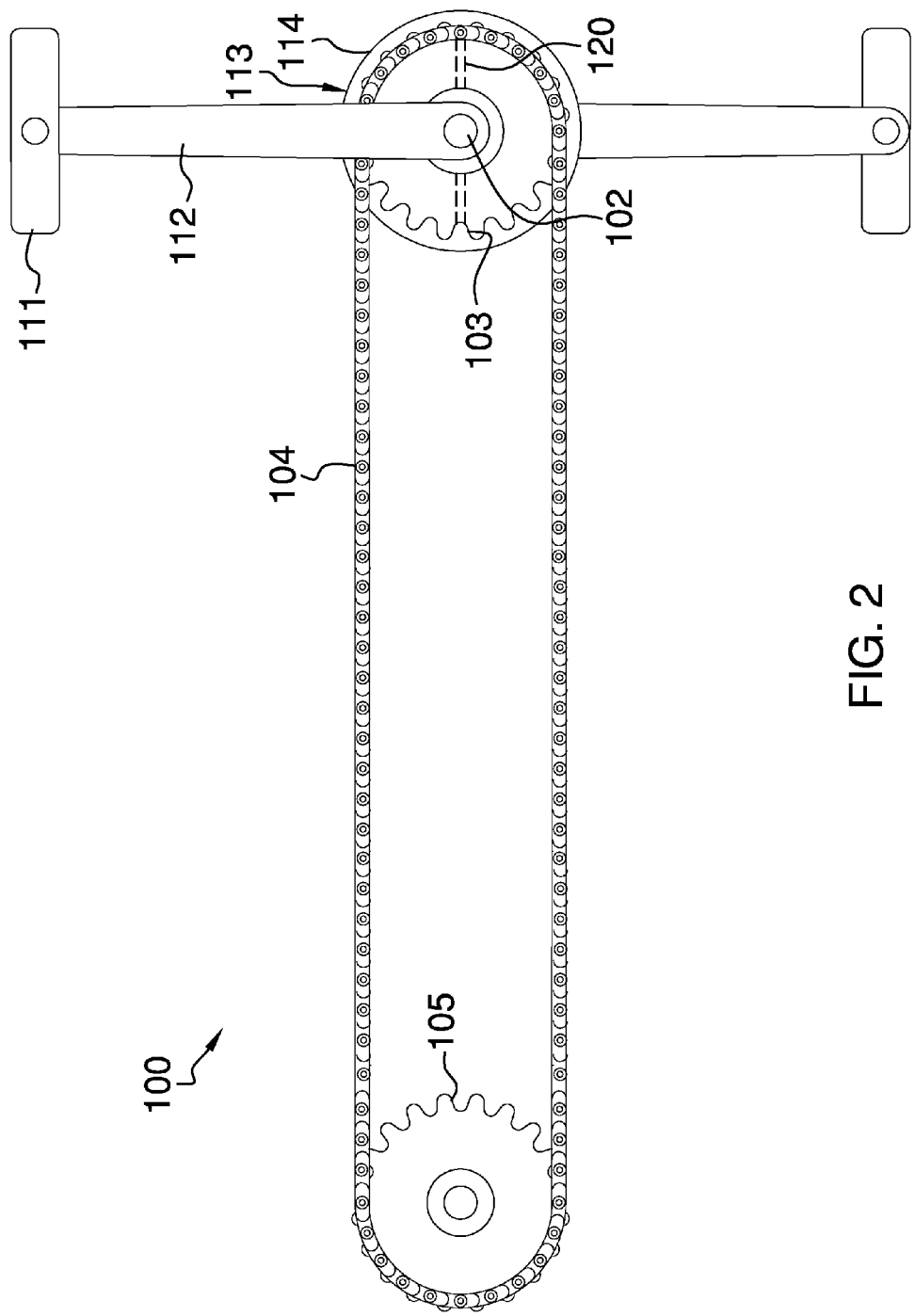
FIG. 2 is a detail view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, theory presented in the preceding technical field, background, brief summary or the following detailed description.

Detailed reference will now be made to a first potential embodiment of the disclosure, which is illustrated in FIGS. 1 through 5.

The bicycle with adjustable pedaling resistance using magnetorheological based fluid 100 (hereinafter invention) comprises a bicycle 101 with a crankshaft 102 affixed to a drive sprocket 103. The drive sprocket 103 is in mechanical connection with a drive chain 104 that extends around a rear sprocket 105. The rear sprocket 105 is affixed to a rear wheel 106. The bicycle has a front wheel 107, as well as a bicycle frame 108, seat 109, and handlebar 110.

The crankshaft 102 is attached to bicycle pedals 111 that rotate in order to drive the invention 100, and which is well known in the art. The bicycle pedals 111 are each attached to a crank arm 112 that in turn is connected to the crankshaft 102.

Figure 3:
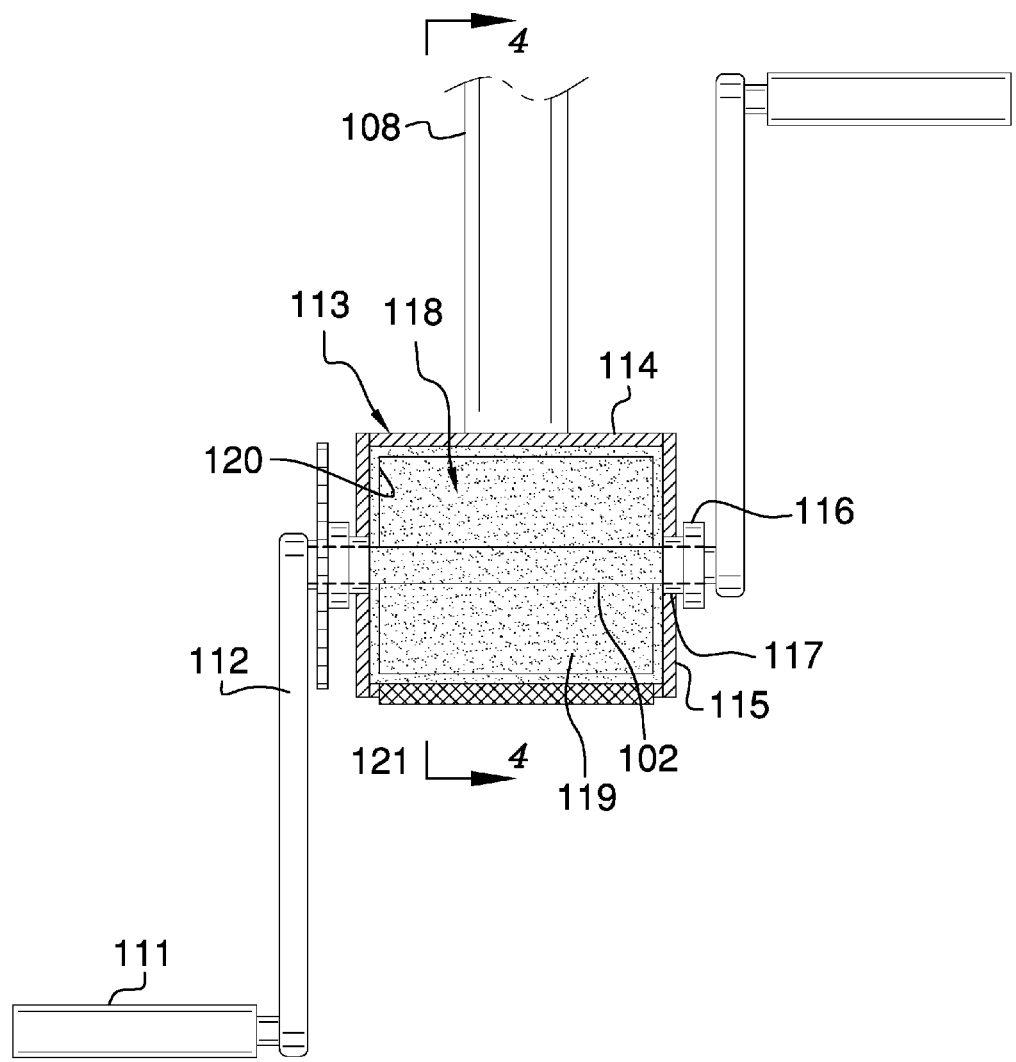
FIG. 3 is a cut-away view of an embodiment of the disclosure.
Figure 4:
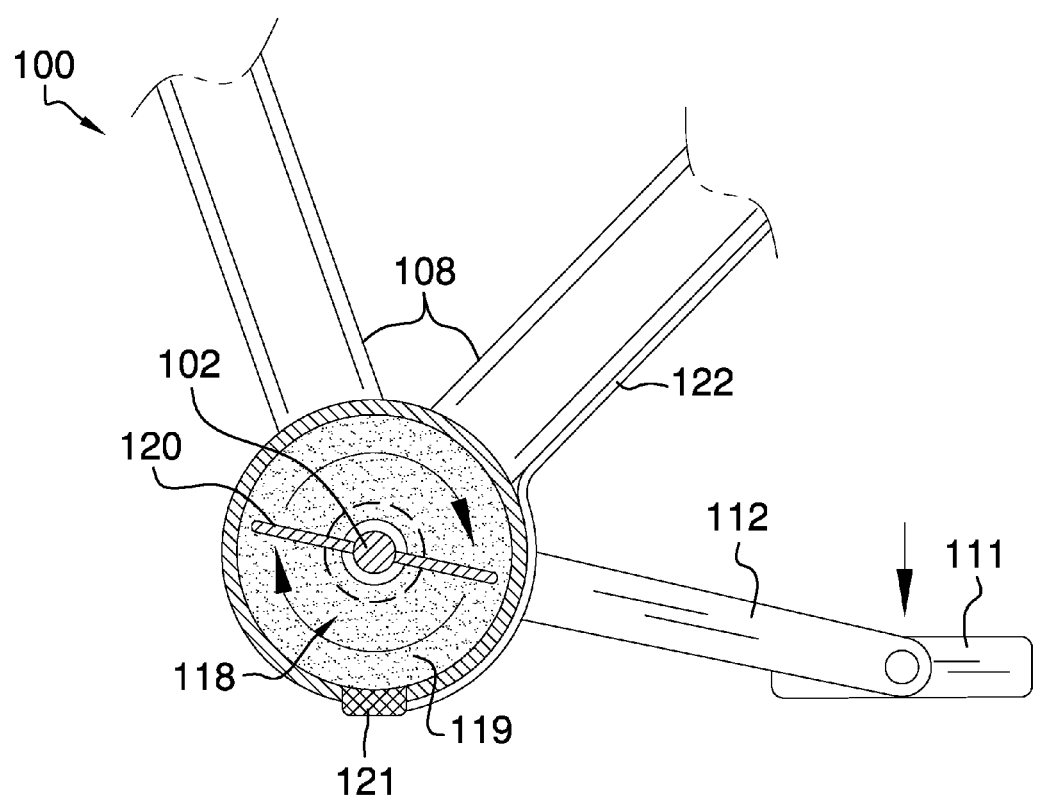
FIG. 4 is a cross-sectional view of an embodiment of the disclosure across 4-4 as shown on FIG. 3.
Figure 5:
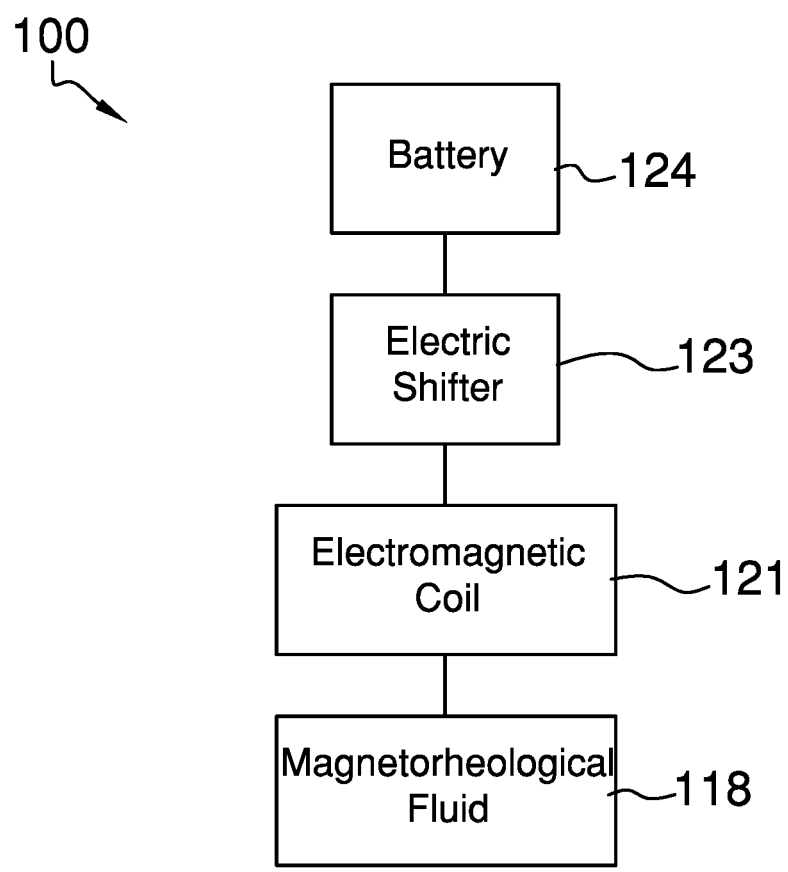
FIG. 5 is a block diagram of an embodiment of the disclosure.

Referring to FIGS. 3-4, the invention 100 includes a pedaling-resistance member 113. The pedaling-resistance member 113 is integrated into the construction of the invention 100, and affords the ability to increase a pedaling resistance of the bicycle pedals 111. Moreover, the pedaling-resistance member 113 is constructed of a cylinder 114 that is affixed to the bicycle concentrically aligned with respect to the crankshaft 102. The cylinder 114 includes end caps 115 that seal off opposing ends of the cylinder 114. Bushings 116 are provided to form a watertight seal between the end caps 115 and the crankshaft 102. The crankshaft 102 exits the end caps 115 at crankshaft holes 117. The bushings 116 seal off the crankshaft holes 117.

The cylinder 114 is partially filled with a magnetorheological fluid 118. It shall be noted that a magnetorheological fluid (MR fluid) is a type of smart fluid in a carrier fluid, usually a type of oil. When subjected to a magnetic field, the fluid greatly increases its apparent viscosity, to the point of becoming a viscoelastic solid. In FIG. 3, the magnetorheological fluid 118 is depicted with a plurality of black dots 119, which represent the magnetic particles suspended within the carrier fluid.

The crankshaft 102 includes at least one paddle 120 affixed thereon. The at least one paddle 120 is able to rotate within the cylinder 114. When an electromagnetic coil 121 applies electricity to the magnetorheological fluid 118, the apparent viscosity increases, and which in turn makes resistance in rotation of the crankshaft 102 via the rotation of the at least one paddle 120 inside of the cylinder 114.

A coil wire 122 is in wired connection with the bicycle frame 108, and is wired to a voltmeter 123 and a powering member 124. The powering member 124 is essentially a battery that supplies electricity to energize the magnetorheological fluid 118. The voltmeter 123 regulates the electricity that is dispensed via the powering member 124 to the electromagnetic coil 121. Ideally the voltmeter 123 is within hand's reach to the handlebar 110.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and and their equivalents.

The inventor claims:

1. A bicycle comprising:
   a crankshaft that is rotated via bicycle pedals in order to rotate a drive chain that in turn rotates a rear wheel of said bicycle;
   wherein a pedaling-resistance member is added to increase the resistance of rotation of the bicycle pedals at the adaptive discretion of an end user;
   wherein the crankshaft is affixed to a drive sprocket;
   wherein the drive sprocket is in mechanical connection with the drive chain that extends around a rear sprocket;
   wherein the rear sprocket is affixed to the rear wheel;
   wherein the bicycle has a front wheel, as well as a bicycle frame, seat, and handlebar;
   wherein the crankshaft is attached to bicycle pedals that rotate in order to drive the drive chain;
   wherein the bicycle pedals are each attached to a crank arm that in turn is connected to the crankshaft;
   wherein the pedaling-resistance member is integrated into the construction of the bicycle frame, and affords the ability to increase a pedaling resistance of the bicycle pedals;
   wherein the pedaling-resistance member is constructed of a cylinder that is affixed to the bicycle frame;
   wherein the cylinder is of hollowed construction, and is concentrically aligned with respect to the crankshaft;
   wherein the cylinder includes end caps that seal off opposing ends of the cylinder;
   wherein bushings are provided to form a watertight seal between the end caps and the crankshaft;
   wherein the crankshaft exits the end caps at crankshaft holes;
   wherein the bushings seal off the crankshaft holes;
   wherein the cylinder is partially filled with a magnetorheological fluid.

2. The bicycle according to claim 1 wherein the crankshaft includes at least one paddle affixed thereon; wherein the at least one paddle is able to rotate within the cylinder.

3. The bicycle according to claim 2 wherein an electromagnetic coil applies electricity to the magnetorheological fluid, which increases the apparent viscosity of the magnetorheological fluid, and which in turn makes resistance in rotation of the crankshaft via the rotation of the at least one paddle inside of the cylinder.

4. The bicycle according to claim 3 wherein a coil wire is in wired connection with the electromagnetic coil.

5. The bicycle according to claim 4 wherein the coil wire extends up the bicycle frame, and is wired to a voltmeter and a powering member.

6. The bicycle according to claim 5 wherein the powering member supplies electricity to energize the magnetorheological fluid.

7. The bicycle according to claim 6 wherein the voltmeter regulates the electricity that is dispensed via the powering member to the electromagnetic coil.

* * * * *